(12) United States Patent
Lee

(10) Patent No.: US 7,460,257 B2
(45) Date of Patent: Dec. 2, 2008

(54) TECHNIQUE FOR TRANSFERRING IMAGE INFORMATION FROM A SCANNING APPARATUS

(76) Inventor: Chen-Ho Lee, 4F, No. 53, Lane 1050, Ming-Hu Rd., Hsinchu (TW)

( * ) Notice: Subject to any disclaimer, the term of this patent is extended or adjusted under 35 U.S.C. 154(b) by 761 days.

(21) Appl. No.: 10/065,611

(22) Filed: Nov. 4, 2002

(65) Prior Publication Data

US 2004/0085597 A1   May 6, 2004

(51) Int. Cl.
G06F 3/12      (2006.01)
G06F 15/00   (2006.01)
G06F 1/00     (2006.01)

(52) U.S. Cl. ............... 358/1.15; 358/474; 358/486; 358/497; 382/313; 348/317

(58) Field of Classification Search ............... 358/1.15, 358/474, 409, 475, 412, 509, 523; 348/317, 348/302, 223; 382/313
See application file for complete search history.

(56) References Cited

U.S. PATENT DOCUMENTS

| | | | | |
|---|---|---|---|---|
| 4,435,732 A | * | 3/1984 | Hyatt | 348/748 |
| 4,680,699 A | | 7/1987 | Uchino | |
| 4,739,396 A | * | 4/1988 | Hyatt | 348/751 |
| 4,786,933 A | * | 11/1988 | Makino | 396/96 |
| 4,866,535 A | * | 9/1989 | Kubota et al. | 358/474 |
| 5,225,914 A | | 7/1993 | Saito | |
| 5,239,393 A | * | 8/1993 | Takeuchi | 358/474 |
| 5,371,766 A | | 12/1994 | Gersbach | |
| 5,434,891 A | | 7/1995 | Mery | |
| 5,510,894 A | * | 4/1996 | Batchelder et al. | 356/301 |
| 5,574,575 A | * | 11/1996 | Kato | 358/474 |
| 5,579,419 A | | 11/1996 | Yaguchi | |
| 5,689,333 A | * | 11/1997 | Batchelder et al. | 356/301 |
| 5,760,727 A | | 6/1998 | Lin | |
| 5,835,138 A | | 11/1998 | Kondo | |
| 5,943,139 A | | 8/1999 | Tang | |
| 5,956,158 A | | 9/1999 | Pinzarrone | |
| 6,009,529 A | | 12/1999 | Park | |
| 6,021,129 A | | 2/2000 | Martin | |
| 6,046,827 A | * | 4/2000 | Ogoshi et al. | 358/487 |
| 6,069,707 A | * | 5/2000 | Pekelman | 358/1.6 |
| 6,100,924 A | * | 8/2000 | Truc et al. | 348/96 |
| 6,285,398 B1 | * | 9/2001 | Shinsky et al. | 348/223.1 |
| 6,366,589 B1 | | 4/2002 | Naudus | |
| 6,459,506 B1 | | 10/2002 | Hu | |
| 6,462,842 B1 | | 10/2002 | Hamilton | |
| 6,473,538 B2 | * | 10/2002 | Kozuka | 382/312 |
| 6,580,457 B1 | * | 6/2003 | Armstrong et al. | 348/317 |
| 6,618,085 B2 | * | 9/2003 | Ishimoto | 348/294 |
| 6,648,226 B2 | | 11/2003 | Haba | |
| 6,747,764 B1 | | 6/2004 | Chu | |
| 6,768,557 B1 | | 7/2004 | Minowa | |
| 7,006,260 B2 | | 2/2006 | Sato | |
| 7,009,721 B1 | | 3/2006 | Murata | |

(Continued)

*Primary Examiner*—Edward L. Coles
*Assistant Examiner*—Negussie Worku
(74) *Attorney, Agent, or Firm*—Stolowitz Ford Cowger LLP

(57) ABSTRACT

A technique for transferring image information from scanning apparatus includes adjusting the period of a shift signal according to the speed of reading data from a scan line by a computer instead of using a memory buffer. Therefore, correct data transmission between the image extraction device and the computer can be achieved with the result of reducing the cost of the scanning apparatus.

25 Claims, 3 Drawing Sheets

U.S. PATENT DOCUMENTS

| | | |
|---|---|---|
| 7,202,981 B2 | 4/2007 | Wang |
| 2002/0003167 A1 | 1/2002 | Cheng |
| 2002/0039139 A1 | 4/2002 | Hsu et al. |
| 2002/0065966 A1 | 5/2002 | Brief |
| 2002/0156941 A1* | 10/2002 | Boll .............................. 710/5 |
| 2003/0025949 A1 | 2/2003 | Wang |
| 2003/0081143 A1 | 5/2003 | Wang |
| 2004/0160652 A1* | 8/2004 | Kimura et al. .............. 358/514 |

* cited by examiner

TECHNIQUE FOR TRANSFERRING IMAGE INFORMATION FROM A SCANNING APPARATUS

BACKGROUND OF INVENTION

1. Field of the Invention

The invention relates in general to a scanning apparatus, and more particularly, to a method of removing memory of a scanning apparatus.

2. Related Art of the Invention

A scanning apparatus is a machine between a copy machine and a camera. In the past, a scanning apparatus was so expensive that only art related workers could use it. Recently, the development of computer technology and market competition has caused the price of the scanning apparatus to drop drastically. A scanning apparatus has thus become one of the major peripherals of a personal computer.

A scanning apparatus can be categorized into various forms according to price or function. For example, a scanning apparatus includes the palm scanner, the paper feeding scanner, the card scanner, the film scanner and the flatbed scanner. Among various types of scanners, the flatbed scanner includes a glass flatbed to dispose a document or a picture thereon. A sensor then moves to read the data of the document or the picture. As the structure of the flatbed scanner is not very complex, and the operation is user friendly, the flatbed scanner is currently the most popular type of scanner.

In the currently available scanning apparatus, a memory buffer, for example, a dynamic random access memory (DRAM) is used to temporarily store the data extracted by the image extraction device such as a charge-coupled device (CCD). The computer then reads and processes the data stored in the memory buffer. FIG. 1 shows a schematic block diagram of using a conventional scanner 10 to transmit the data extracted by an image extraction device 12 and stored in a memory buffer 14 to a computer 16. In FIG. 1, to transmit the data extracted by the image extraction device 12 of the scanner 10, the image extraction device 12 temporarily stores the data in the memory buffer 14 of the scanner 10 first. When the computer 16 is ready for processing data, the data stored in the memory buffer 14 is then read by the computer 16. The data transmission between the image extraction device 12 and the computer 16 is described as follows. FIG. 2 is a sequence diagram of a Transfer signal TR and a shift signal PH during the exposure time. As shown in FIG. 2, when the Transfer signal TR is enabled (at a high level), the image extraction device 12 transmits each pixel of the data of one scan line to the computer 16 via the shift signal PH during the period of one Transfer signal TR (the exposure time). Meanwhile, the shift signal PH is enabled at a high level, and the shift signal PH shifts one pixel of the data of the scan line during one period thereof. The period of the shift signal PH is constant. If the period, of the shift signal PH is 1 ms and the scan line has 5400 pixels per inch, the image extraction device 12 will transmit the data of the scan line to the computer 16 within 5400 ms (the exposure time). If the computer fails to read the data of the scan line within the exposure time, a data reading error is caused. Therefore, the memory buffer 14 is used to temporarily store the data of the scan line transmitted via the shift signal PH, providing sufficient time for the computer 16 to read the data of the scan line. As the conventional scanner 10 requires the memory buffer 14 to ensure the correct data transmission between the image extraction device 12 and the computer 16, the cost is increased.

SUMMARY OF INVENTION

The present invention provides a scanning apparatus of which the memory is not required. The period of a shift signal is adjusted according to the speed of reading the data of the scan line by a computer, so that the memory buffer is not used, while the data can be correctly transmitted between the image extraction device and the computer. The present invention thus provides a scanning apparatus with a much reduced cost.

In the method of removing a memory from the scanning apparatus including an image extraction device provided by the present invention, each pixel of data of a scan line is transmitted to the computer via a shift signal during a period of a Transfer signal TR. The period is also referred to as an exposure time. The period of the shift signal is adjusted according to the speed of reading the data of the scan line, so that the computer will finish reading the data within the exposure time.

In one embodiment of the present invention, if the shift signal transmits each pixel of the data of the scan line to the computer in a time shorter than the exposure time, a waiting time is added to equal the exposure time.

The exposure time is either constant or variable.

In one embodiment of the present invention, the Transfer signal TR is enabled at a high level.

In one embodiment of the present invention, the shift signal is enabled at a high level.

In one embodiment of the present invention, the image extraction device includes a charge-coupled device.

In one embodiment of the present invention, the memory includes a dynamic random access memory.

The present invention further provides a method of removing a memory from a scanning apparatus. The scanning apparatus includes an image extraction device. During a TR period of a Transfer signal TR, also referred to as an exposure time, the image extraction device extracts and transmits each pixel of data of a scan line to a computer. In this method, when the computer processes the data at a fast processing speed, the period of the shift signal is increased in accordance with the processing speed. When the computer slows down the speed to process the data, the period of the shift signal is reduced. Meanwhile, the computer has to finishing reading the data of the scan line within the exposure time.

Accordingly, the present invention adjusts period of the shift signal according to the speed of reading the data of the scan line by the computer. Therefore, the data transmitted between the image extraction and the computer without using the memory buffer, consequently the cost of the scanning apparatus is greatly reduced.

BRIEF DESCRIPTION OF DRAWINGS

These, as well as other features of the present invention, will become more apparent upon reference to the drawings wherein.

DETAILED DESCRIPTION

Figure 1:
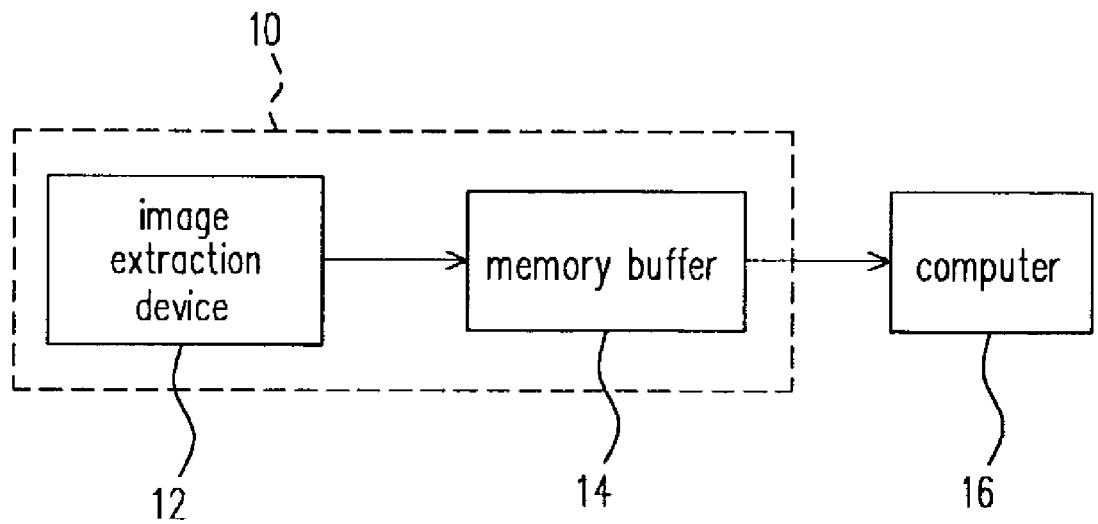
FIG. 1 shows the data transmission between a memory buffer and a computer by an image extraction device of a conventional scanner.
Figure 2:
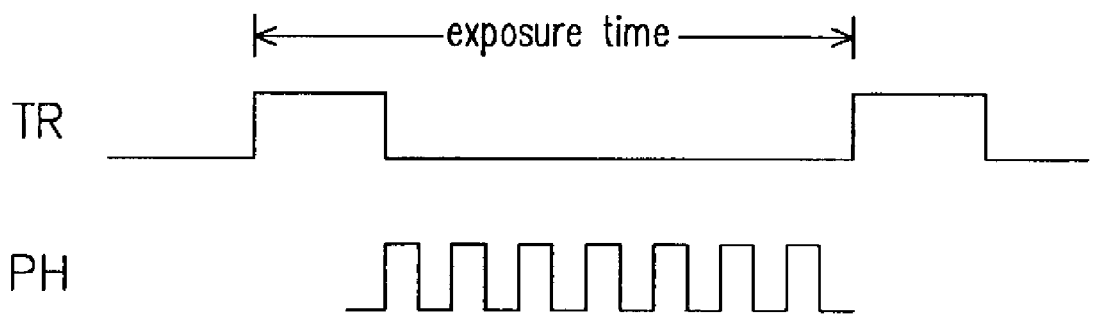
FIG. 2 shows the sequence diagram of a Transfer signal TR and a shift signal during a period of an exposure time.
Figure 3:
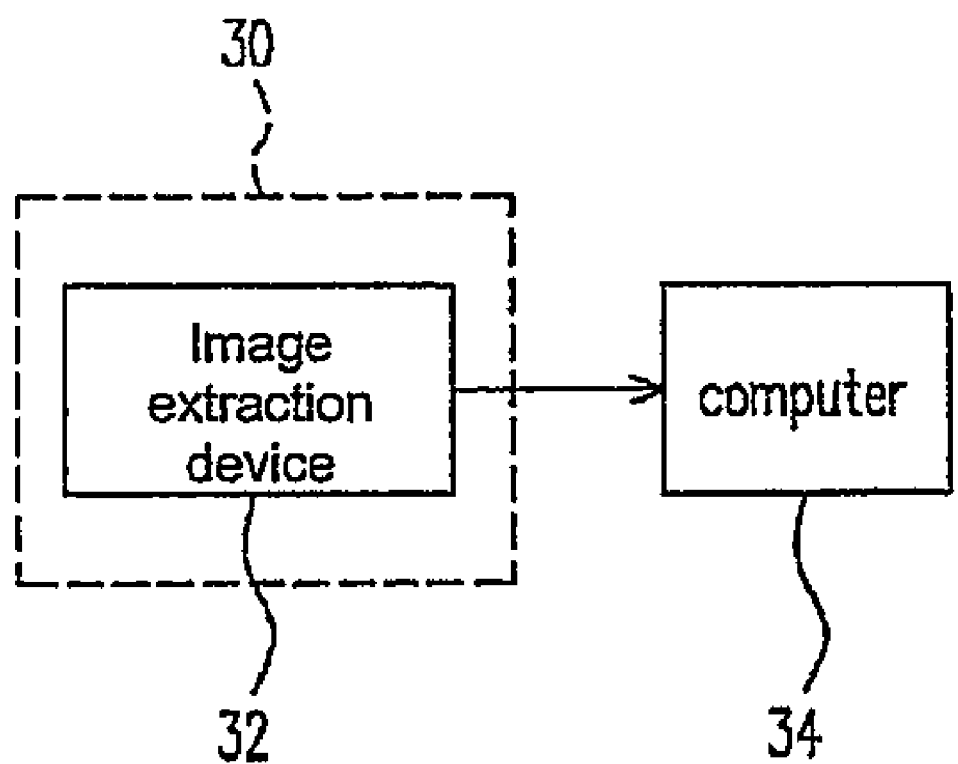
FIG. 3 shows a schematic diagram for transmitting the data extracted by the image extraction device of a scanning to a computer according the one embodiment of the present invention.

Referring to FIG. 3, a schematic drawing of transmitting data extracted by an image extraction device such as a charge-coupled device 32 of a scanning apparatus 30 to a computer 34 is shown. In FIG. 3, when the image extraction device 32 of the scanning apparatus 30 is transmitting data extracted thereby to the computer 34, a memory buffer is not required for such transmission. Instead, by adjusting a period of a shift signal Ph according to the speed of reading the data of the scan line by the computer 34, the data can be transmitted between the image extraction device 32 and the computer 34.

Figure 4:
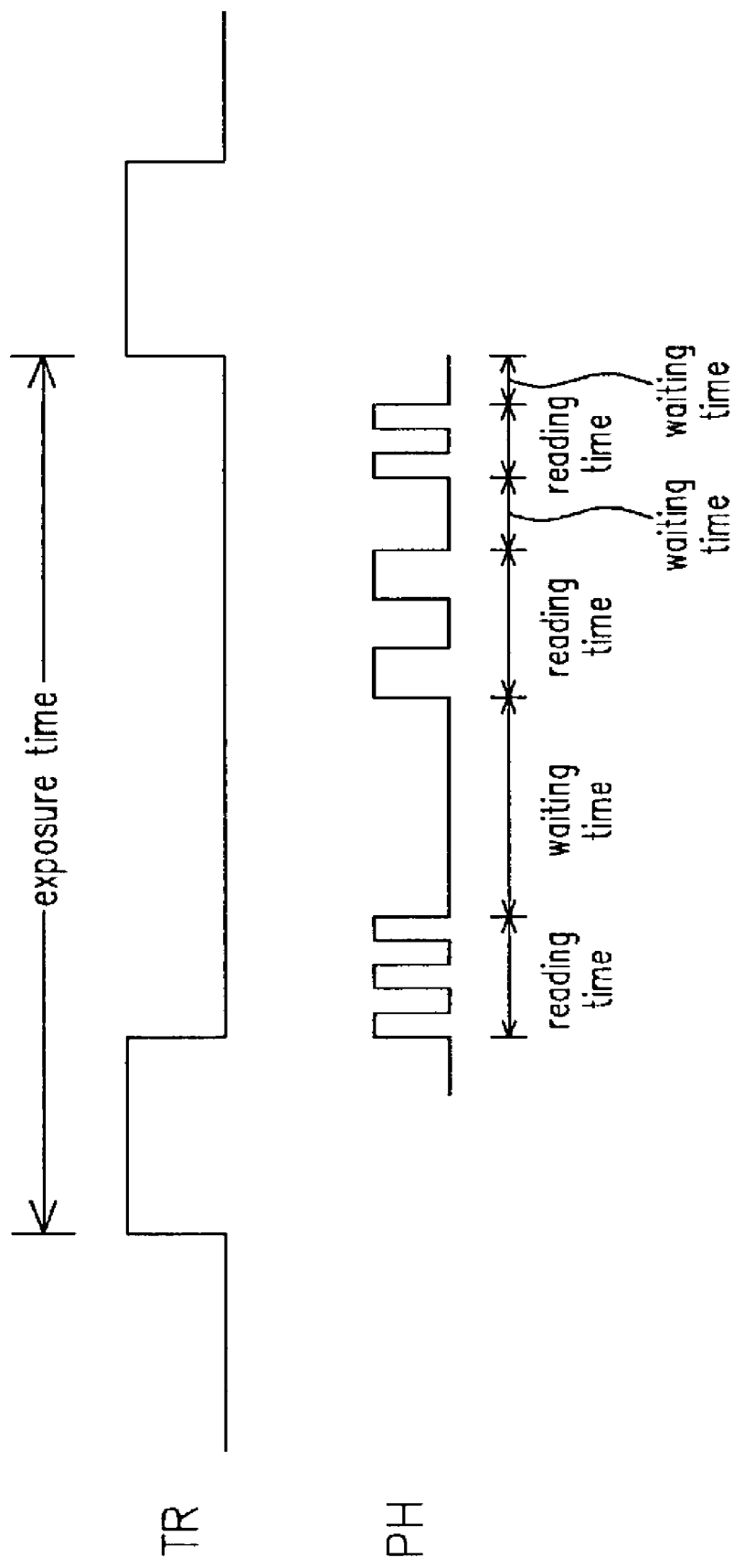
FIG. 4 shows the sequence diagram of a Transfer signal TR and a shift signal PH within an exposure time according to one embodiment of the present invention.

The following describes the method of removing the memory such as a dynamic random access memory of a scanning apparatus 30. In FIG. 4, the sequence diagram of a Transfer signal TR and a shift signal PH within an exposure time is illustrated. In this embodiment, the TR signal and the shift signal PH are both enabled at a high level. As shown in FIG. 4, when the Transfer signal TR is enabled and during a period thereof (also referred as an exposure time as shown in FIG. 4), each pixel of data of a scan line is transmitted to the computer 34 from the image extraction device 32 via the shift signal PH. The exposure of the Transfer signal TR can be either constant or variable. In one period of the shift signal PH, the shift signal PH shifts one pixel of the data of the scan line. As shown in FIG. 4, the period of the shift signal PH is variable. That is, the period of the shift signal Ph is varied according to the speed of reading the data of the scan line by the computer 34. However, the computer 34 has to finish reading the data of the scan line within the exposure time. In other words, when the computer 34 uses a fast speed to process the data of the scan line, the period of the shift signal PH is adjusted faster accordingly. On the contrary, when the computer 34 cannot process the data of the scan line within the exposure time with a slow processing speed, the period of the shift signal PH is slowed down according to the slow processing speed. Further, if the shift signal PH transmits each pixel of the data of the scan line to the computer 34 in a time shorter than the exposure time (the reading time as shown in FIG. 4), a waiting time (the waiting time as shown in FIG. 4) is added to equal the exposure time, such that the computer can finish reading the data of the scan line within the exposure time as required. For example, when the period of the shift signal PH is shortened from 1 ms to 0.5 ms and the exposure time is 5400 ms for a scan line including 5400 pixels per inch, as the reading time is 2700 ms only, a waiting time of 2700 ms has to be added to meet the requirement of finishing reading the data of the scan line in the exposure time. According to the above, the scanning apparatus 30 does not include a memory buffer for storing the data of the scan line, such that the cost of the scanning apparatus 30 is reduced.

According to the above, the present invention adjusts the period of the shift signal according to the speed of reading the data of the scan line by the computer, so that the memory is not required, while the correct data transmission between the image extraction device and the computer can be achieved with a reduced cost.

Other embodiments of the invention will appear to those skilled in the art from consideration of the specification and practice of the invention disclosed herein. It is intended that the specification and examples be considered as exemplary only, with a true scope and spirit of the invention being indicated by the following claims.

The invention claimed is:

1. A method of transferring image information from a scanning apparatus, the method comprising:
   providing a transfer signal to an image extraction device in the scanning apparatus, the image extraction device coupled to a computer;
   transmitting data for each pixel of a scan line to the computer via a shift signal without storing the data in a memory buffer of the scanning apparatus;
   adjusting a period of the shift signal based at least in part on a speed of reading the data by the computer, wherein data for all of the pixels of the scan line is transmitted during a period adding a waiting time to shift signal based at least in part on the period of transfer signal.

2. The method according to claim 1, wherein the period of the transfer signal comprises a constant period of time.

3. The method according to claim 1, wherein the period of the transfer signal comprises a variable period of time.

4. The method according to claim 1, wherein the transfer signal is enabled at a high level.

5. The method according to claim 1, wherein the shift signal is enabled at a high level.

6. The method according to claim 1, wherein the image extraction device comprises a charge-coupled device.

7. A method of transferring image information from a scanning apparatus, the method comprising:
   providing a transfer signal to an image extraction device in the scanning apparatus, wherein the scanning apparatus does not include a memory buffer;
   transmitting pixel data for a scan line from the image extraction device to a computer via a shift signal, the shift signal having a cycle time; and
   changing the cycle time of the shift signal from a first default cycle time to a second different cycle time if the computer processes the pixel data using an actual processing speed that is different than an expected processing speed, the expected processing speed associated with the first default cycle time.

8. The method according to claim 7, wherein the shift signal comprises a waiting time based at least in part on the cycle time of the transfer signal.

9. The method according to claim 8, wherein the cycle time of the transfer signal comprises a constant period of time.

10. The method according to claim 8, wherein the cycle time of the transfer signal comprises a variable period of time.

11. The method according to claim 7, wherein the transfer signal is enabled at a high level.

12. The method according to claim 7, wherein the image extraction device initiates said transmitting responsive to detecting a rising edge in the transfer signal.

13. The method according to claim 7, wherein the image extraction device comprises a charge-coupled device.

14. An apparatus, comprising:
   an image extraction means for providing scan line data;
   a timing signal output means for outputting a shift signal, the shift signal to control when the image extraction means initiates transferring portions of the scan line data from the apparatus to an external device; and
   a feedback means for detecting a rate that the external device processes the transferred scan line data and feeding back the detected rate to the timing signal output means;
   wherein the timing signal output means is configured to vary a period of the shift signal if the processing rate does not correspond with a transfer time for the scan line data.

15. The apparatus of claim 14, wherein the timing signal output means is further configured to add a waiting time to the shift signal based at least in part on a period of a transfer signal that controls the transfer time for the scan line data.

16. The apparatus of claim 15, wherein the period of the transfer signal comprises a constant period of time.

17. The apparatus of claim 15, wherein the period of the transfer signal comprises a variable period of time.

18. The apparatus of claim 14, wherein the image extraction means comprises a charge-coupled device.

19. The apparatus of claim 14, wherein the timing signal output means is configured to increase the period of the variable shift signal response to detecting a processing rate of the external device that is less than an expected rate.

20. A scanner, comprising:
- a light source to illuminate a document supported by a document platform;
- an image extraction device to provide scan line data according to an exposure time; and
- signal output circuitry to control transfer of the scan line data from the scanner to an external device, the signal output circuitry operable to:
- generate a signal having a cycle time, the cycle time of the signal controlling a frequency that the scanner initiates transfer of a portion of the scan line data from the scanner to the external device; and
- vary the cycle time according to a rate that the external device processes the transferred scan line data.

21. The apparatus of claim 20, wherein the cycle time is increased when the processing rate does not reach a threshold rate needed to complete transfer of the scan line data during the exposure time.

22. The apparatus of claim 20, wherein the signal output circuitry is further operable to:
- trigger the image extraction device to provide new scan line data at the end of the exposure time; and
- delay triggering the image extraction device if the cycle time is increased beyond a threshold cycle time.

23. The apparatus of claim 20, wherein the signal comprises a repeating waveform and the cycle time is an amount of time to output one instance of a repeating waveform.

24. The apparatus of claim 20, wherein the signal output circuitry is operable to vary the cycle time by either increasing or decreasing an amount of time between rising or falling edges in the signal.

25. The apparatus of claim 20, wherein each transferred portion of the scan line data represents a pixel.

* * * * *